US010391918B2

(12) United States Patent
Livesay et al.

(10) Patent No.: US 10,391,918 B2
(45) Date of Patent: Aug. 27, 2019

(54) LOAD BEARING RAIL AND TIE-DOWN RING ASSEMBLY

(71) Applicant: Sunrez Corp, El Cajon, CA (US)

(72) Inventors: Mark Livesay, El Cajon, CA (US); Bret Tollgaard, El Cajon (CA)

(73) Assignee: Sunrez, Corp., El Cajon, CA (US)

( * ) Notice: Subject to any disclaimer, the term of this patent is extended or adjusted under 35 U.S.C. 154(b) by 0 days.

(21) Appl. No.: 15/881,468

(22) Filed: Jan. 26, 2018

(65) Prior Publication Data

US 2019/0031078 A1     Jan. 31, 2019

Related U.S. Application Data

(63) Continuation-in-part of application No. 15/140,916, filed on Apr. 28, 2016, now Pat. No. 9,914,386.

(60) Provisional application No. 62/153,645, filed on Apr. 28, 2015.

(51) Int. Cl.
*B60R 11/00* (2006.01)
*B60P 7/08* (2006.01)

(52) U.S. Cl.
CPC ..................................... *B60P 7/08* (2013.01)

(58) Field of Classification Search
CPC ............... B62D 25/20; B62D 25/2027; B62D 25/2036; B62D 25/2009; B62D 21/02; B62D 25/087; B62D 25/2018
USPC ........ 296/193.07, 187.08, 204, 75, 1.01, 64, 296/198; 428/99, 116, 158, 172, 192, 85, 428/61, 209
See application file for complete search history.

(56) References Cited

U.S. PATENT DOCUMENTS

| | | | | |
|---|---|---|---|---|
| 2,643,148 A | * | 6/1953 | Gaston | E05C 19/14 220/324 |
| 4,987,654 A | | 1/1991 | Mejias | |
| 5,226,569 A | * | 7/1993 | Watjer | B60R 7/10 211/123 |
| 5,820,205 A | * | 10/1998 | Ammons | B60R 7/10 296/214 |
| 5,855,408 A | * | 1/1999 | Rickabus | B60N 3/023 105/354 |
| 6,138,975 A | | 10/2000 | McDaid | |
| 6,431,543 B1 | | 8/2002 | Cole | |
| 6,431,643 B2 | * | 8/2002 | Grey | B60N 2/002 105/354 |
| 7,686,551 B2 | | 3/2010 | Grasso | |
| 8,376,675 B2 | | 2/2013 | Schulze | |
| 8,465,065 B2 | | 6/2013 | Browne | |
| 8,662,804 B2 | | 3/2014 | Thoma | |

(Continued)

*Primary Examiner* — D Glenn Dayoan
*Assistant Examiner* — Sunsurraye Westbrook
(74) *Attorney, Agent, or Firm* — Lewis Kohn & Walker LLP; David M. Kohn

(57) ABSTRACT

A cargo restraint system having a load bearing perimeter rail and a tie-down ring assembly. The load bearing perimeter rail further comprised of a plurality of protruding bosses with a hole within each boss. Further, a tie-down ring assembly comprised of a tie-down ring and a pin wherein the tie-down ring is inserted through the hole in the plurality of protruding bosses of the load bearing perimeter rail. Protruding bosses and/or recessed load bearing features within a load bearing rail are capable of accepting additional components beyond a tie-down ring assembly to increase interchangeability of load bearing platforms.

11 Claims, 20 Drawing Sheets

(56) References Cited

U.S. PATENT DOCUMENTS

2017/0218668 A1* 8/2017 Amenda ................ E05B 85/10

* cited by examiner

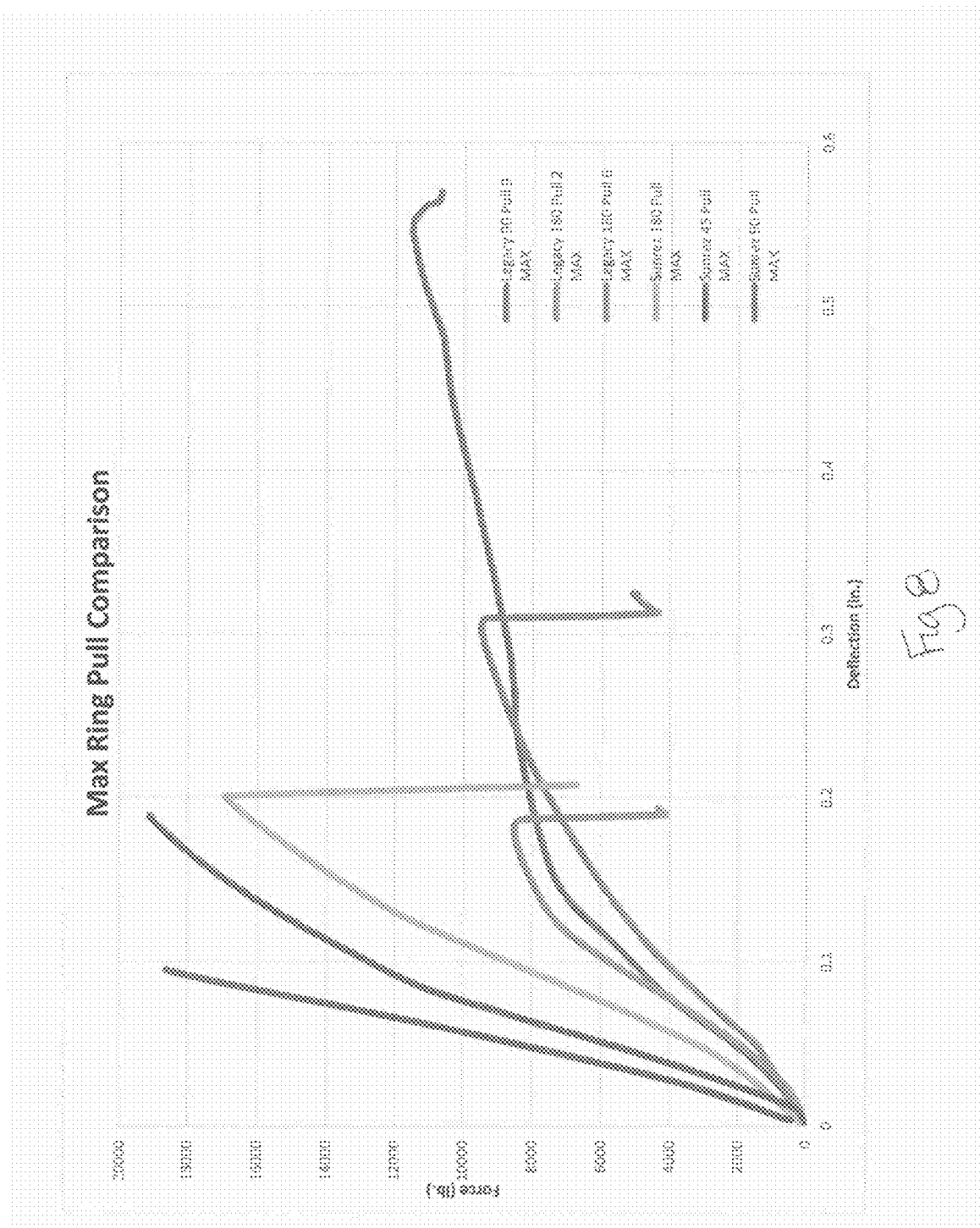

LOAD BEARING RAIL AND TIE-DOWN RING ASSEMBLY

RELATED APPLICATIONS

This application is a continuation-in-part application claiming the benefit of priority from U.S. patent application Ser. No. 15/140,916, filed Apr. 28, 2016, which claims the benefit of priority from U.S. Provisional Application No. 62/153,645, filed on Apr. 28, 2015, the entire contents of which are herein incorporated by reference.

BACKGROUND OF THE INVENTION

Conventional air cargo pallets consist of an outer rail which runs along the perimeter of a sandwich panel core. This outer rail has holes in which a tie-down ring and bracket assembly are then attached to said outer rail by one time use fasteners. Said fasteners are difficult to remove when replacing a tie-down ring and bracket assembly. Additionally, because tie-down rings and brackets are a fixed assembly, when one or the other is damaged, both must be replaced, increasing the cost of repair. Also, due to the nature of the current fasteners, point loads incur upon force being applied to said tie-down ring and high levels of stress are experienced at the attachment points between the outer rail and tie-down ring. The described tie down ring and load bearing rail assembly obviates these problems by providing a much stronger ring assembly that can carry higher loads, but is designed in a way that provides load paths that distribute and avoid the concentrated high stress loading points, and is furthermore assembled from components that are re-usable and provide a simple mechanism to assemble, disassemble, and reassemble the tie down ring and load bearing rail assembly.

SUMMARY OF THE INVENTION

The present invention is in the technical field of load bearing hardware. More particularly, the present invention is in the technical field of restraint systems. More particularly, the present invention is in the technical field of rail and hardware integration methods.

It is an object of the present invention to provide a method for attaching a tie-down ring to a load bearing rail system.

It is another object of the present invention to provide a load bearing rail and ring assembly capable of being pulled in any direction at 7,500 pounds without yielding.

It is still another object of the present invention to provide a load bearing rail and ring assembly capable of being pulled up to 11,250 pounds without ultimate failure.

It is an object of an alternative embodiment of the present invention to provide a method of attaching items beyond a tie-down ring to a load bearing rail system.

It is still another object of an alternative interpretation of the present invention to provide a method of attaching items to a load bearing rail with protruding and/or recessed load bearing features.

BRIEF DESCRIPTION OF THE DRAWINGS

FIG. 8 shows the results of a ring maximum load test comparing the Legacy restraint system and the restraint system of the present invention at various degrees.

DETAILED DESCRIPTION OF THE INVENTION

Figure 1:
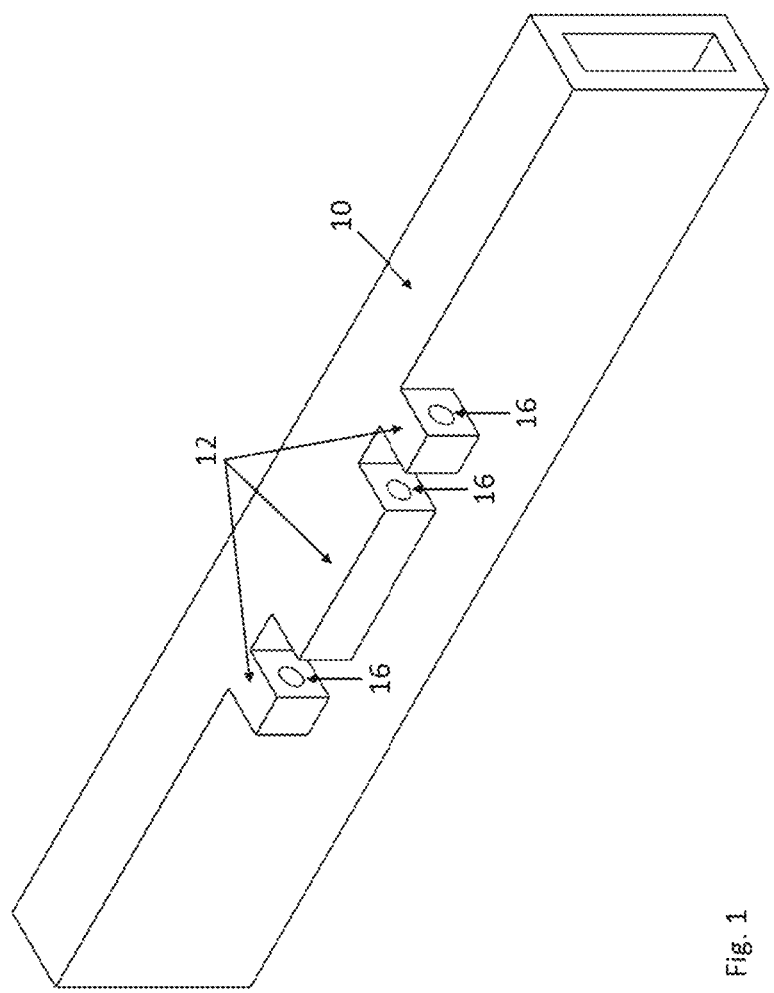
FIG. 1 is a perspective view of the protruding bosses of the load bearing perimeter rail of the present invention.
Figure 2:
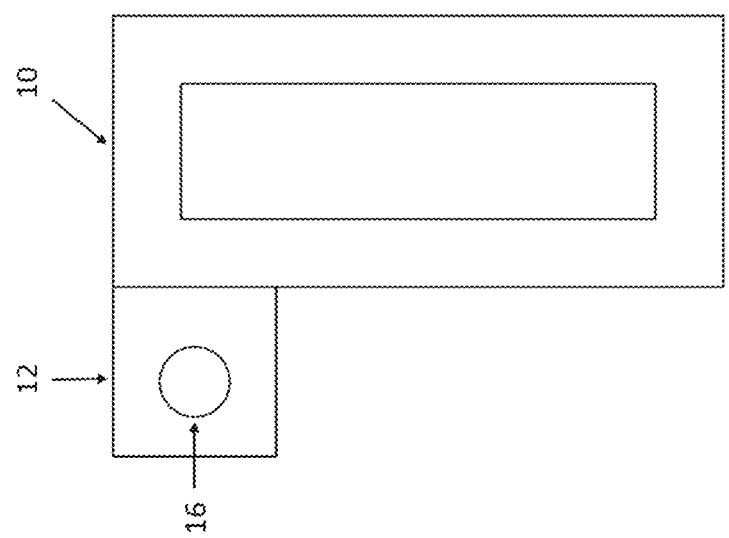
FIG. 2 is a side view of the protruding bosses of the load bearing perimeter rail of the present invention.

Referring now to the invention in more detail, FIG. 1 and FIG. 2 illustrate an improved load bearing perimeter rail 10 with protruding bosses 12 which are integral to the load bearing perimeter rail 10. The bosses 12 each have a hole 16 which extends completely through each boss 12 in an orientation parallel to perimeter rail 10.

Figure 3:
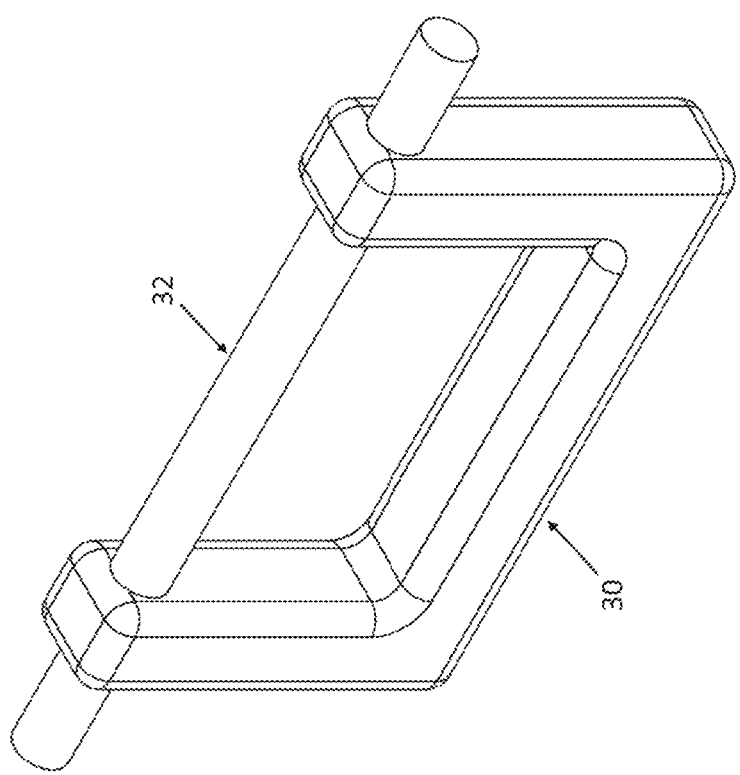
FIG. 3 is a perspective view of the ring assembly of the present invention.

In more detail, FIG. 1 and FIG. 2 further illustrate load bearing perimeter rail 10 including integral bosses 12 which are designed to withstand loads transferred to it by load bearing hardware which fits between bosses 12. The holes 16 in the bosses 12 are designed to accommodate a pin or bolt (as shown in FIG. 3) which allows load bearing hardware to rotate within the holes 16.

In further detail, FIG. 1 and FIG. 2 illustrate load bearing perimeter rail 10 shaped such that its thicknesses and contours are sufficient at distributing all necessary loads. Load bearing perimeter rail 10 is roughly 2.25" tall and 1.6" wide from tip of bosses 12 to back wall of load bearing perimeter rail 10. Each boss 12 is approximately 0.6"×0.6"

square and sufficiently thick about hole 16, such as 0.15", and are a structural member of load bearing perimeter rail 10.

The load bearing perimeter rail 10 shown in FIG. 1 and FIG. 2 may be made of aluminum or any other sufficiently rigid and strong material such as composites, metals, or plastics. Load bearing perimeter rail 10 may be manufactured by extrusion, pultrusion, casting, and any other methods in which a sufficiently strong load bearing perimeter rail 10 can be made. Boss 12 is an integral member of load bearing perimeter rail 10 and is therefore constructed of the same materials as load bearing perimeter rail 10 whereas hole 16 in boss 12 represents the absence of said material of load bearing perimeter rail 10.

With reference to FIG. 3 shown is the tie-down ring assembly. This tie-down ring assembly consists of the tie-down ring 30 and pin 32. Tie-down ring 30 rotates about pin 32. Pin 32 transfers loads from tie-down ring 30 into the surrounding material about pin 32. The tie-down ring 30 is shaped such that its thicknesses and contours are sufficient at distributing all necessary loads, roughly 3" wide and 1.80" tall. Pin 32 is similarly sized according to load requirements, measuring approximately 0.25" in diameter and roughly 4" long.

The tie-down ring assembly shown in FIG. 3 may be made of a high-strength steel for tie-down ring 30 or any other sufficiently rigid and strong material such as composites, metals, or high-strength plastics. Similarly, bolt 32 is composed of high-strength steel or any other sufficiently rigid and strong material such as composites, metals, or high-strength plastics. The geometry of tie-down ring 30 and pin 32 is such that it meets all necessary load requirements for the application, and as such, can accommodate a range of geometries to suit the needs of the given application.

Figure 4:
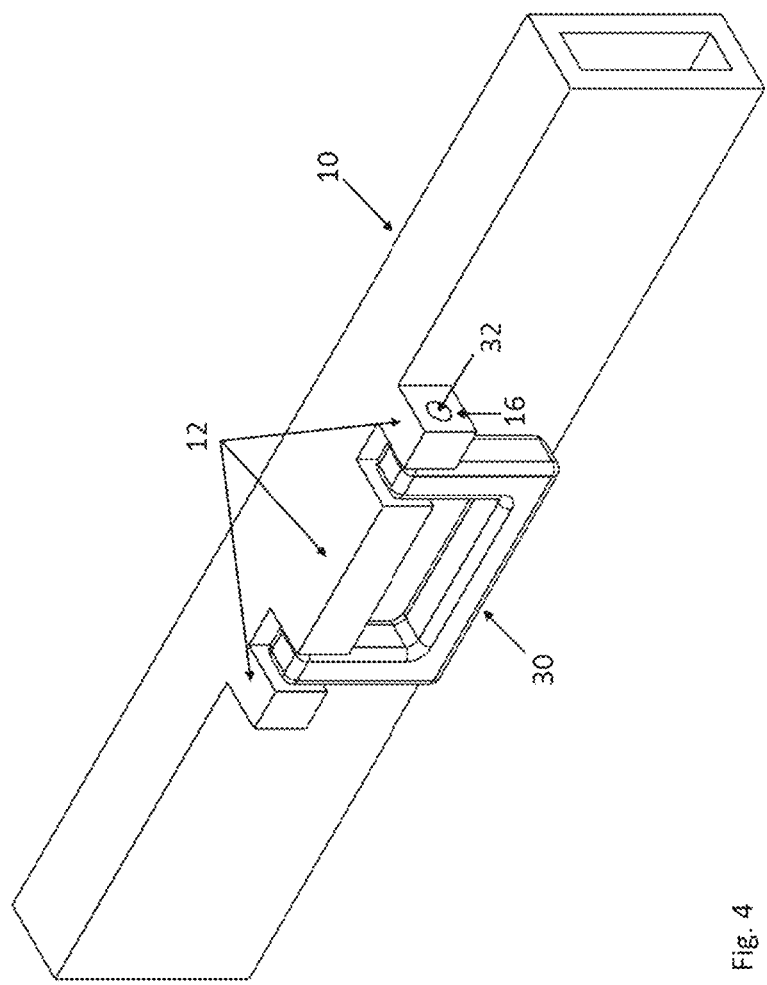
FIG. 4 is a perspective view of the assembled tie-down ring in the protruding bosses of the load bearing perimeter rail of the present invention.
Figure 5:
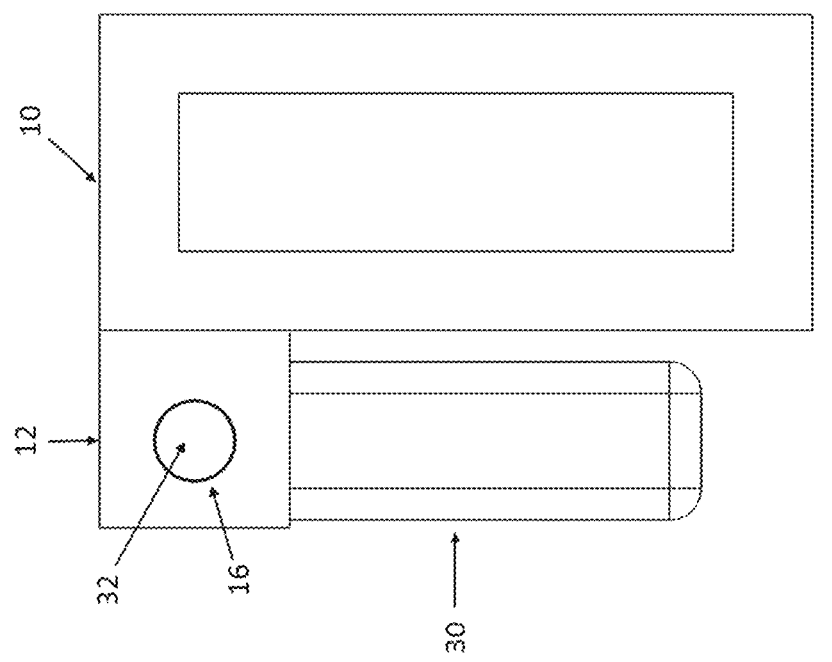
FIG. 5 is a side view of the assembled tie-down ring in the protruding bosses of the load bearing perimeter rail of the present invention.

With reference to FIG. 4 and FIG. 5 shown is the load bearing perimeter rail 10 with protruding bosses 12 that are integral to load bearing perimeter rail 10 with the tie-down ring assembly attached through hole 16. The tie-down ring assembly consists of tie-down ring 30 and pin 32.

In more detail, FIG. 4 and FIG. 5 further illustrate the protruding bosses 12 which are an integral member of load bearing perimeter rail 10 and act as a bracket for which the pin 32 passes through holes 16 located in the bosses 12. Tie-down ring 30 rotates about pin 32 so it may hang freely when not in use or rotate to a desired position when engaged.

In further detail, FIG. 4 and FIG. 5 illustrate the load bearing perimeter rail 10 and integral protruding bosses 12 are shaped such that the loads generated by tie-down ring 30 and pin 32 will be sufficiently strong.

Figure 6:
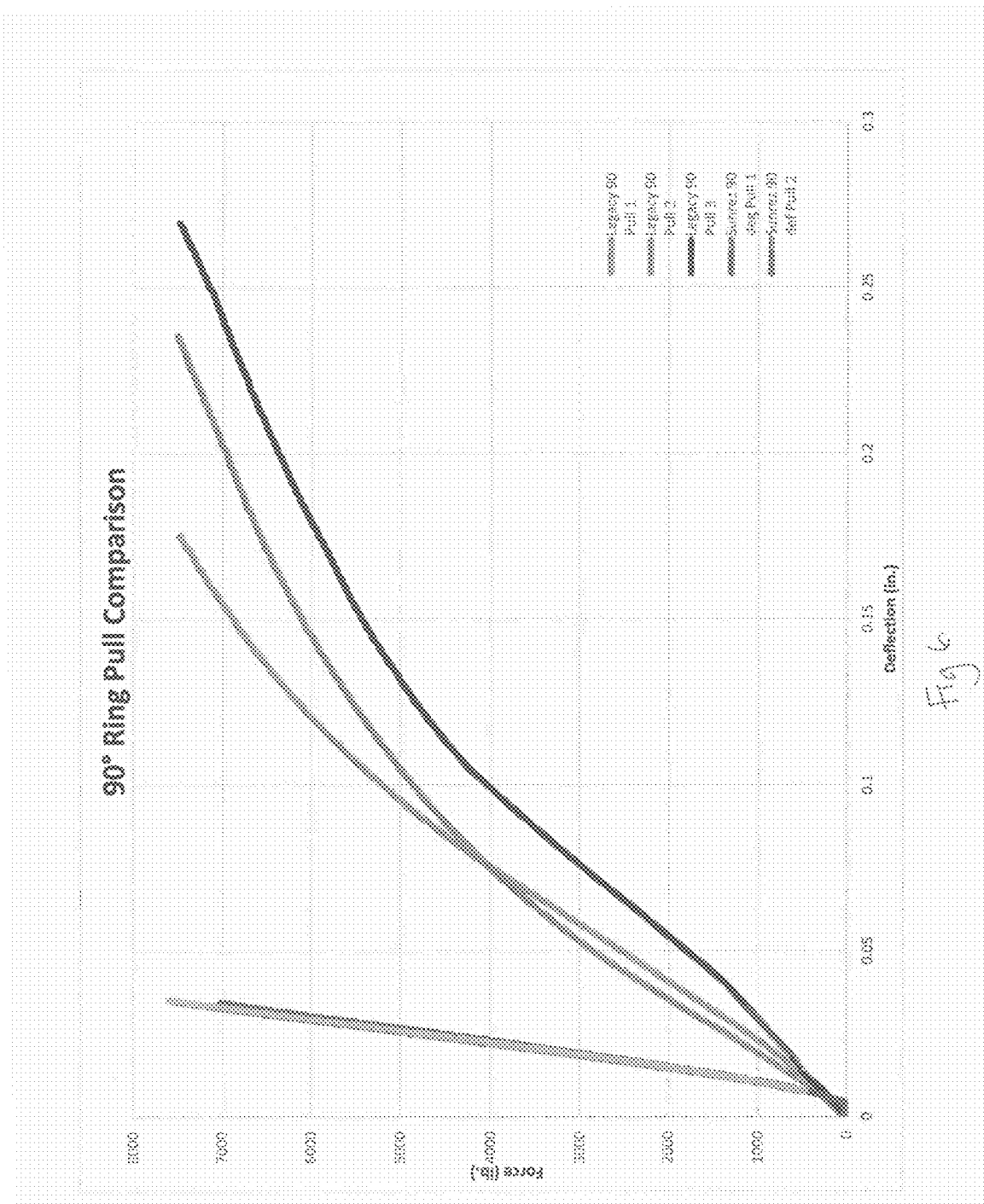
FIG. 6 shows the results of a 90° ring load test comparing the Legacy restraint system and the restraint system of the present invention.
Figure 7:
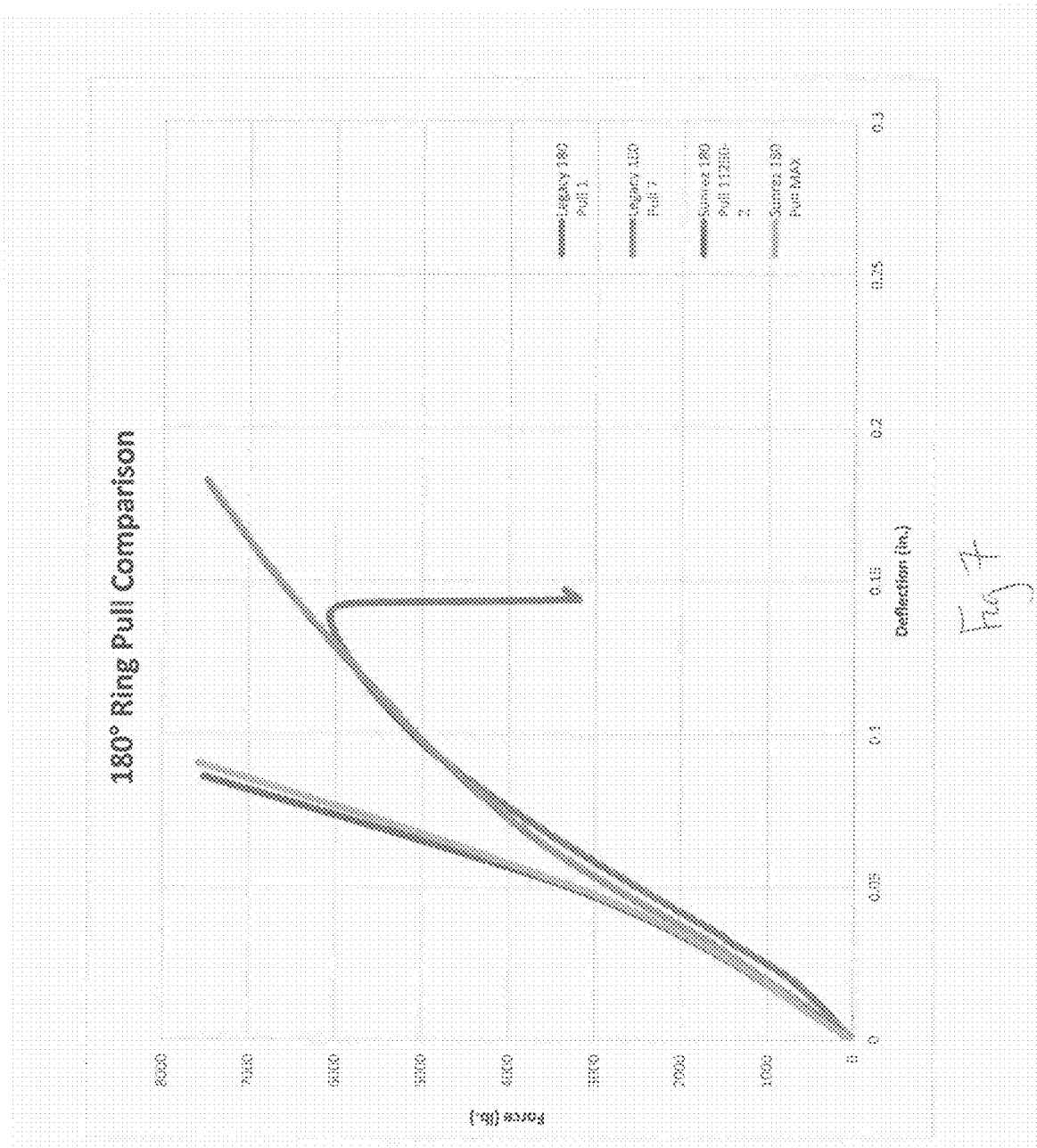
FIG. 7 shows the results of a 180° ring load test comparing the Legacy restraint system and the restraint system of the present invention.

Briefly, FIG. 6-FIG. 8 demonstrate the improved performance of the cargo load restraint system of the present invention over the old cargo restraint system of the prior art. For proper functionality, the tie-down ring is capable of rotating at least 225° in a vertical plane wherein the vertical plane intersects with a pallet edge at a right angle. The tie-down rings must be capable of withstanding a load of 7500 pounds along lines forming various degrees with an upper pallet surface without evidence of deformation.

The tie-down rings were load tested along with the old cargo restraint system of the prior art. Specifically, the load tests were performed using a force of up to 7500 pounds at 90° and 180°. Additionally, a maximum load pull comparison was performed in order to determine how much force the tie-down ring is capable of withstanding without ultimate failure. Ultimate failure is defined as breaking of a material.

The data confirms the superior performance of the tie-down ring of the present invention at each force and degree tested. At 90°, the tie-down ring deflected less than 0.05 inch under 7500 pounds of force and less than 0.1 inch at 180° before returning to their initial position upon release of the load, indicating no yielding has taken place. The tie-down ring of the present invention was capable of far exceeding the load requirements and was successfully pulled in any direction without ultimate failure of 11,250 pounds. Further, the cargo load restraint system may be pulled in several directions to over 19,000 pounds without ultimate failure.

Figure 9A:
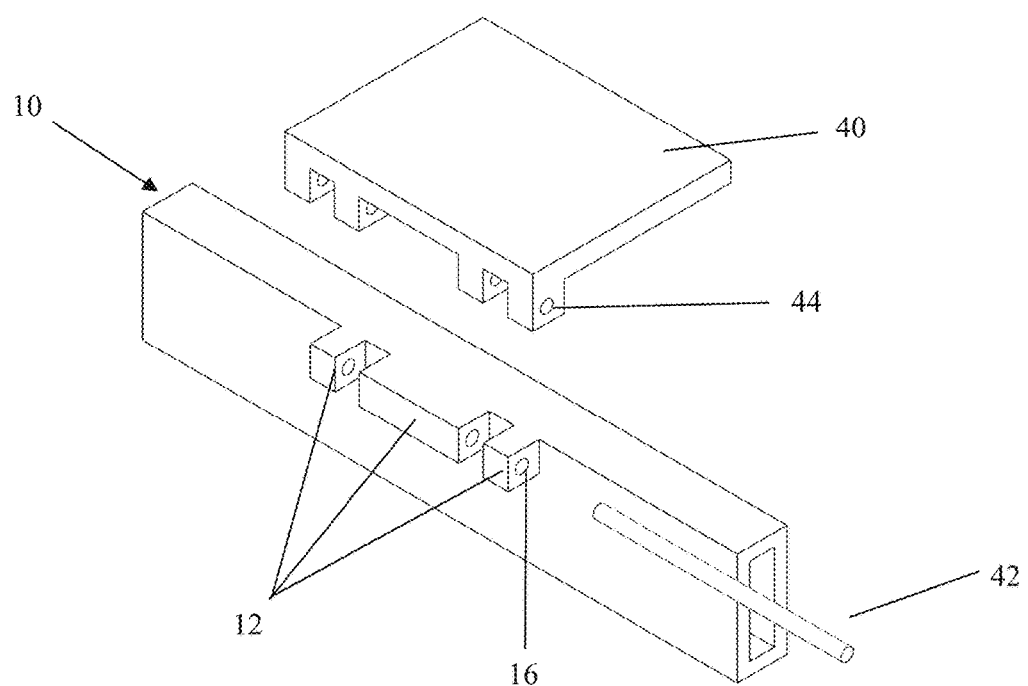
FIG. 9a shows an exploded view of an intermodular device being fastened to the protruding bosses of a load bearing rail.
Figure 9B:
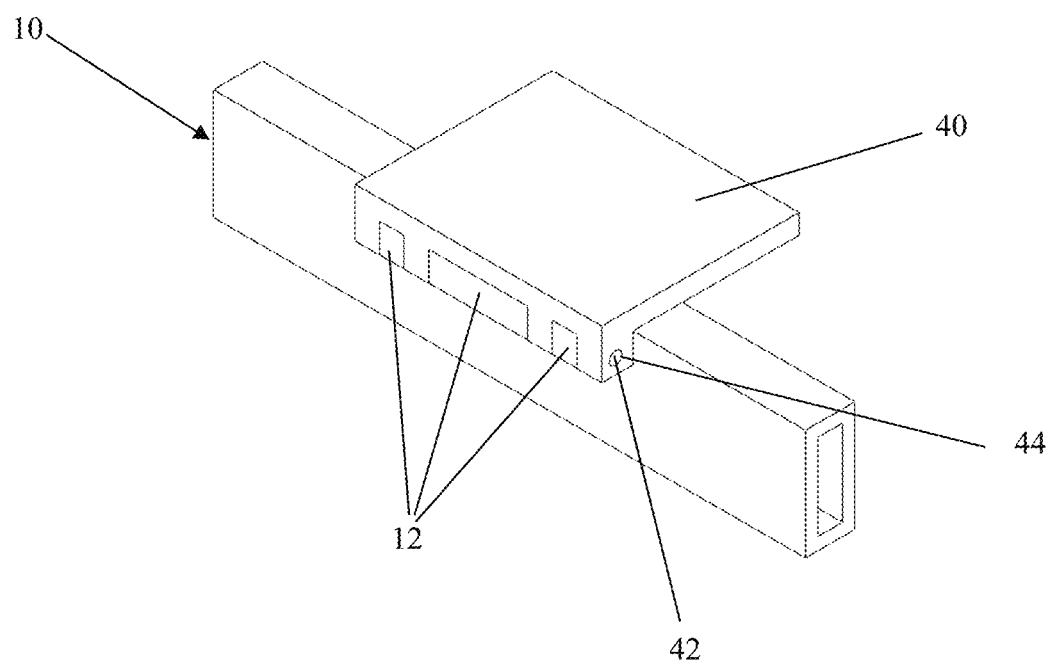
FIG. 9b shows an assembled view of an intermodular device being fastened to the protruding bosses of a load bearing rail.

Referring now to an alternative embodiment of the present invention in FIGS. 9a and 9b, load bearing rail 10 containing protruding bosses 12 integrates with intermodular device 40 having device holes 44 and attachment hardware 42 through holes 16. FIG. 9a depicts an exploded view of FIG. 9b wherein attachment hardware 42 secures intermodular device 40 to load bearing rail 10 by delivering attachment hardware 42 through device hole 44 and hole 16. Similar to the tie-down ring 30 feature of FIG. 3, which provides a component capable of fastening to load bearing rail 10, intermodular device 40 represents additional items able to interact with protruding bosses 12 such that loads may be transferred from intermodular device 40, through attachment hardware 42, and into protruding bosses 12 of load bearing rail 10. Preferably, intermodular device 40 may rotate from about 0 degrees to about 300 degrees around load bearing rail 10.

In more detail, FIGS. 9a and 9b show a method of attaching additional components to load bearing rail 10 via protruding bosses 12 beyond a tie-down ring as previously displayed. Intermodular device 40 may be made of metals, composites, plastics, or natural materials such that the inherent strength of the material is able to transfer loads from the intermodular device 40 into load bearing rail 10 through protruding bosses 12. Similarly, attachment hardware 42 and load bearing rail 10, which incorporates protruding bosses 12, can be made of materials such as composites, metals, plastics, or natural materials such that the design and material makeup of each component is able to meet the required load conditions of said part. Device holes 44 and holes 16 may be arranged in any fashion, such that complementarity is maintained between device holes 44, holes 16 and attachment hardware 42 in order for all three to interact in accordance with the locking features described in the figures.

Figure 10:
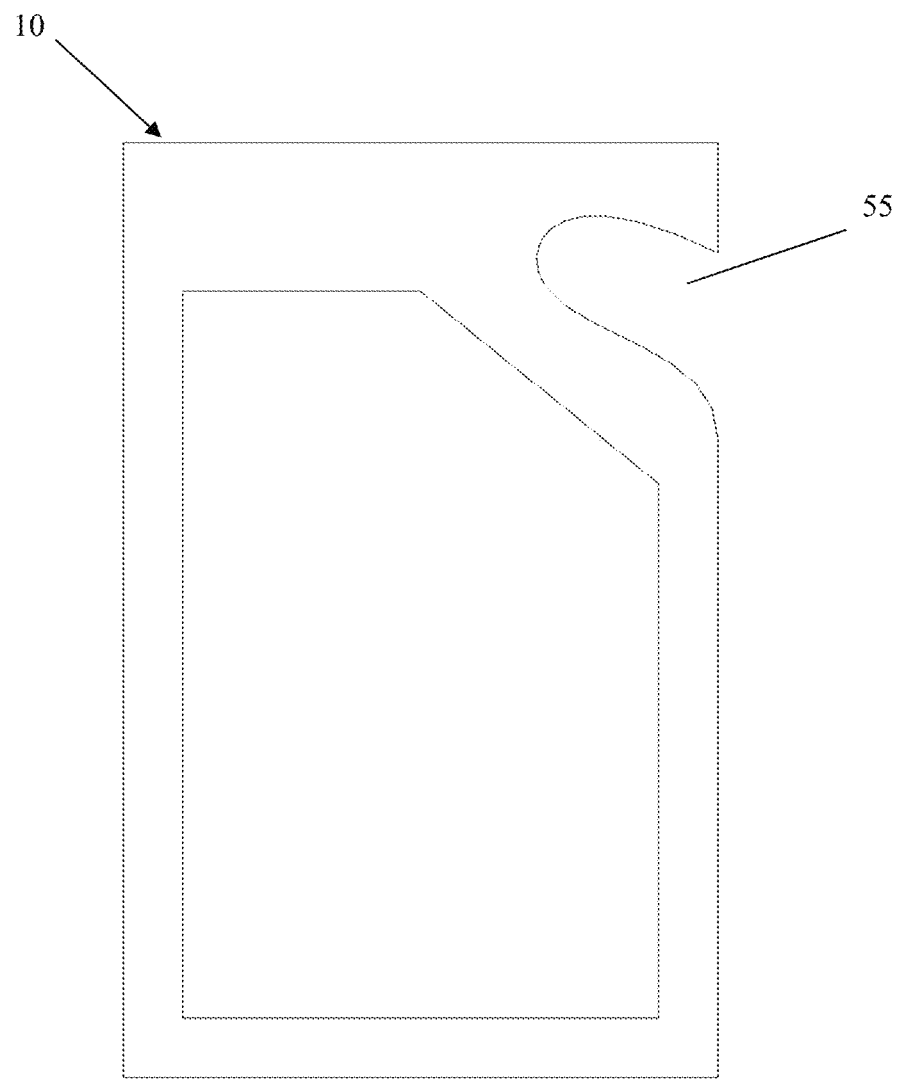
FIG. 10 depicts a side view of a load bearing rail with a recessed area.
Figure 11:
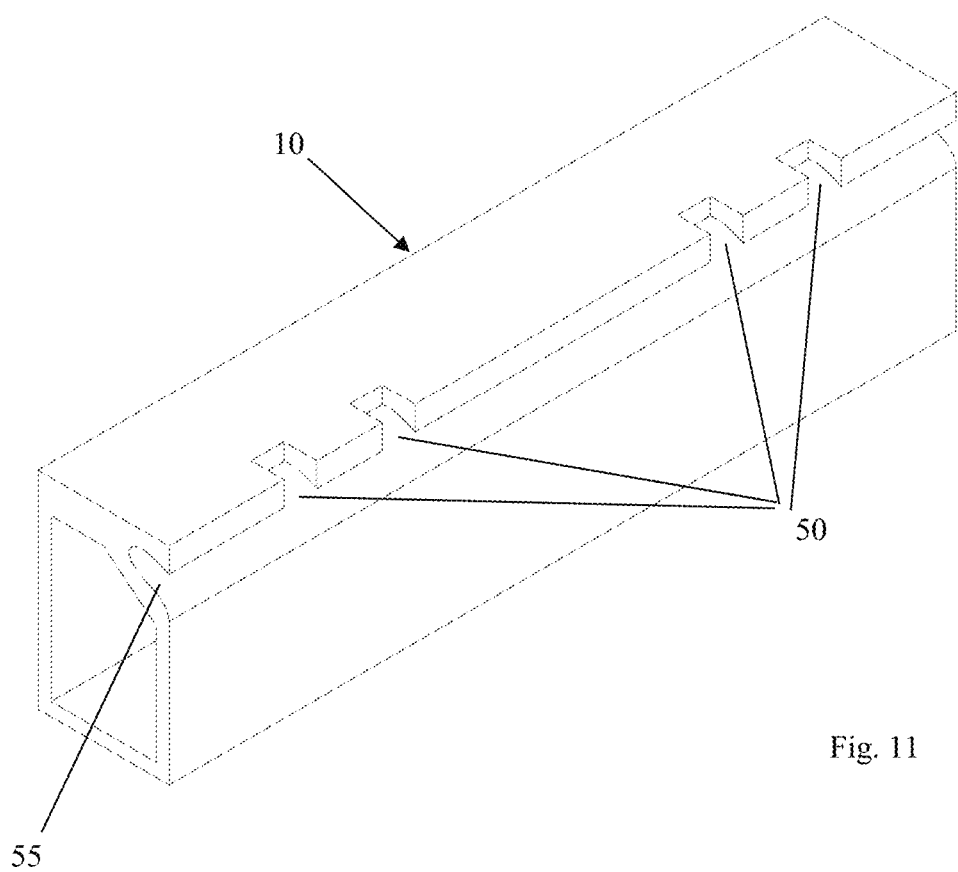
FIG. 11 displays an isometric view of a load bearing rail with a plurality of recessed load bearing features.

Turning now to an alternative embodiment of the present invention in FIG. 10 and FIG. 11, load bearing rail 10 contains recessed area 55 which is capable of transferring loads from outside forces similarly to the previously described protruding bosses 12. Recessed area 55 is formed as a linearly arranged cavity rather than the protruding external feature of protruding bosses 12. Alternatively, recessed area 55 is positioned in a parallel manner relative to a top surface of load bearing rail 10 such that a lip is formed at the intersection of the top surface of load bearing rail 10 and recessed area 55. An internal structure such as recessed area 55 is capable of integrating with load bearing devices differently than protruding bosses 12 of the previously described figures and further expands the capabilities of load bearing rail 10.

Figure 12:
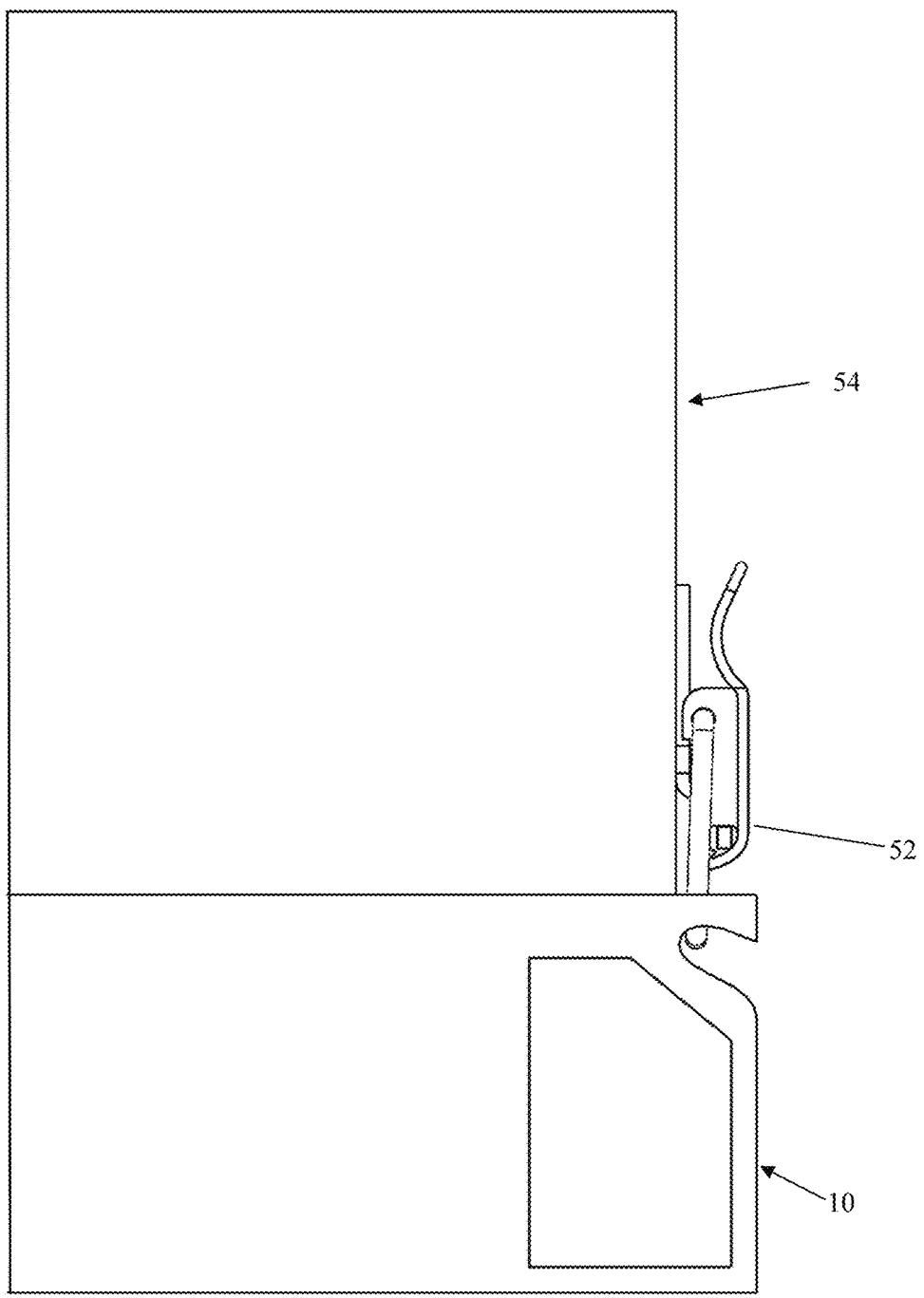
FIG. 12 shows a side view of a cargo secured to a load bearing rail having a recessed area by means of a restraint device.

As observed in FIG. 10 and FIG. 11, recessed load bearing feature 50 and recessed area 55 is composed of the same material as load bearing rail 10 since both recessed features are generated by designing load bearing rail 10 such that a void is created and is often made of materials such as metals, composites, plastics, or natural materials. This is the case for both the recessed area 55 as well as the recessed load bearing features 50. Load bearing rail 10 can be made by manufacturing methods such as extrusion, pultrusion, casting, or any other manufacturing methods in which a load bearing rail can be produced Referring now to an alternative embodiment of the present invention in FIG. 12 and FIG. 13, components are fastened to load bearing rail 10 via recessed load bearing feature 50 by use of restraint device 52 attached to cargo 54. Restraint device 52 showcases the novel approach of recessed load bearing feature 50 and load bearing rail 10 in which the lack of protruding bosses of previous examples produces a new means of integrating load transferring components with load bearing rail 10.

Figure 13:
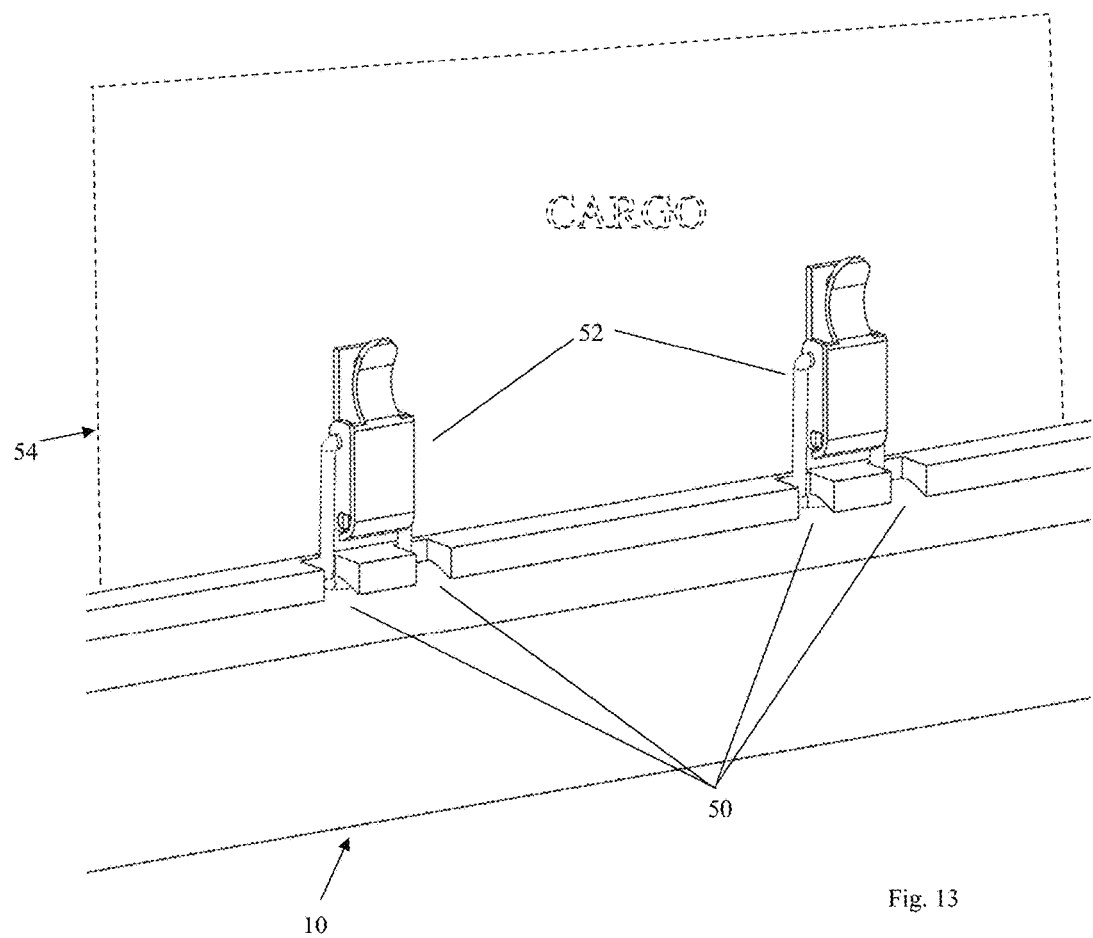
FIG. 13 displays an isometric view of cargo secured to a load bearing rail with recessed load bearing features by means of multiple restraint devices.

As further described in FIG. 13, restraint device 52 can comprise of any such device and method to which restraint device 52 is capable of transferring the forces generated through cargo 54 into the load bearing rail 10 via recessed load bearing feature 50. Cargo 54, to which restraint device 52 attaches, can be any such item which is intended to be fixed to load bearing rail 10. Cargo restraint device 52 can be made of materials such as metals, composites, plastics, or natural materials such that the design and material makeup of cargo restraint device is able to meet the required load conditions of said part.

Figure 14:
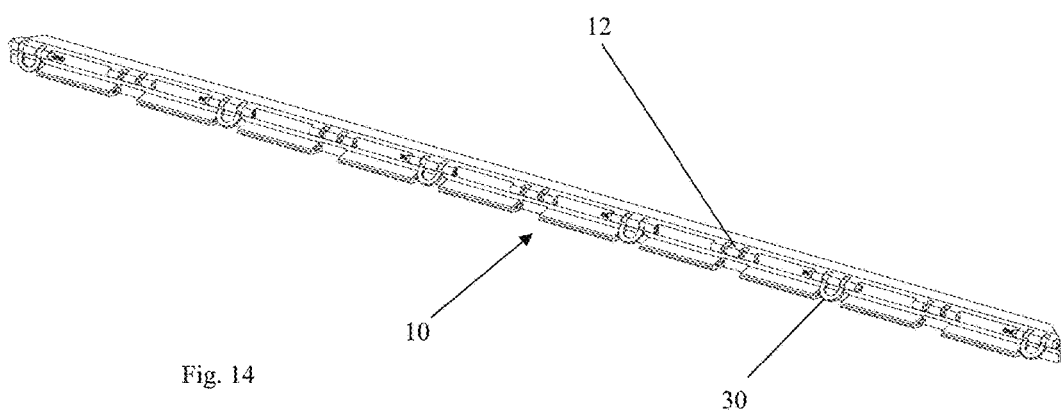
FIG. 14 displays a 463L pallet rail with additional protruding bosses.
Figure 15:
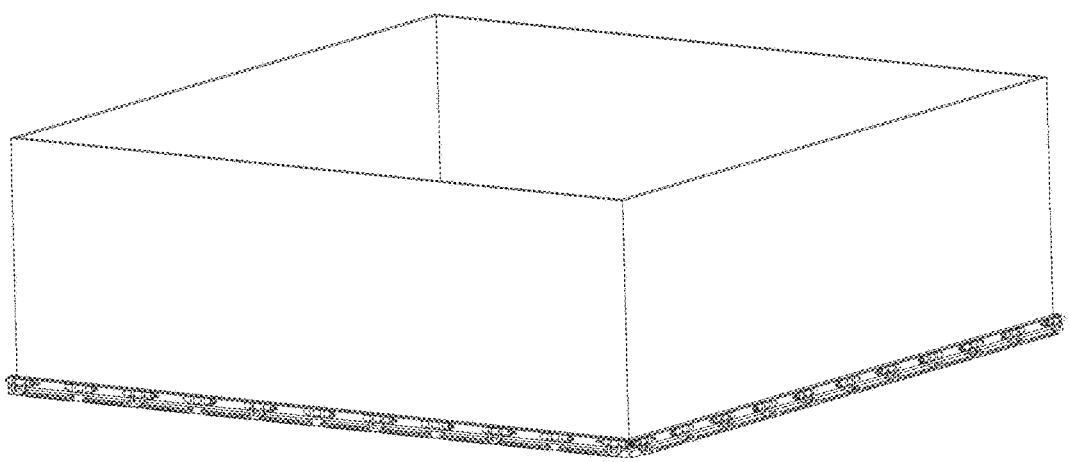
FIG. 15 shows a 463L pallet containing rails with additional protruding bosses in which intermodular devices are attached generating walls surrounding the pallet.

Referring now to an alternative embodiment of the present invention in FIG. 14 and FIG. 15, load bearing rail 10 comprise additional protruding bosses 12 such that the frequency of tie-down ring 30 and attachment hardware 32 are capable of meeting their requirements while simultaneously adding additional capacity to load bearing rail 10 wherein intermodular devices 40 are placed to erect a wall on each side of a 463L pallet.

Load bearing rails and rings can be made to any length and therefore can be attached to the edge of a structure including but not limited to cargo holds of ships, rail road cars, cargo baskets or roof rack systems of a car, cable bridges (rings or other devices can be used to pass through the bosses on the load bearing cable to support weight/loads), flooring panels, trucks of various configurations (i.e. pick up, flat bed, utility trucks), rails running on top of a fence or wall with small rings which hold lights or wiring which is drawn across them from another wall to another, rails securely mounted on a wall or ceiling and secured joist to joist and provide strength for hanging or securing items, and stand along and staked to the ground to act as load bearing rails for securing items such as tents, shade screens, or any other item which may draw a cable from one area to another.

An alternative interpretation of the present invention includes mounting items other than the previously described tie-down ring assembly to a load bearing rail. Components can be mounted directly to the protruding bosses of the load bearing rail and create hard mount locations for objects such as, but not limited to, fixtures, walls for portable shelters, and bases of cabinets for a galley or lavatory. Such components serve as a way of expanding the potential capacity of items such as a 463L cargo pallet, but should not be limited to ways of increasing the interchangeability of only cargo pallets. Load bearing rails utilized on vehicles such as pickup trucks, military vehicles, cable cars, and more may possess protruding bosses which directly accept mounting capabilities from objects like, but not limited to, tool boxes, storage containers, and utility boxes. This obviates the need for additional components to restrain cargo or objects while also serving as a more robust method for distributing payload and stresses from objects fastened to the load bearing rail.

Additionally, one can expand upon the novel function of the load bearing rail to include not just protruding bosses but also recessed load bearing features. It has been previously explained how the innovative protruding bosses possess an advantage over the prior art by generating a load path for items such as a tie-down ring to distribute stress from said tie-down ring directly into a load bearing rail, but a load bearing rail can also be produced by using recessed load bearing features. Recessed mounting locations can be produced by many ways, one of which includes constructing a cavity in an extrusion or pultrusion for which attachment hardware hooks into said cavity and is used to restrain objects. Recessed load bearing features on a load bearing rail can be designed so items can be secured with traditional attachment hardware, or with alternative means such as interlocking mechanisms, rotational or twisting movements, wedges, press fit applications, as well as clamping forces.

Figure 16:
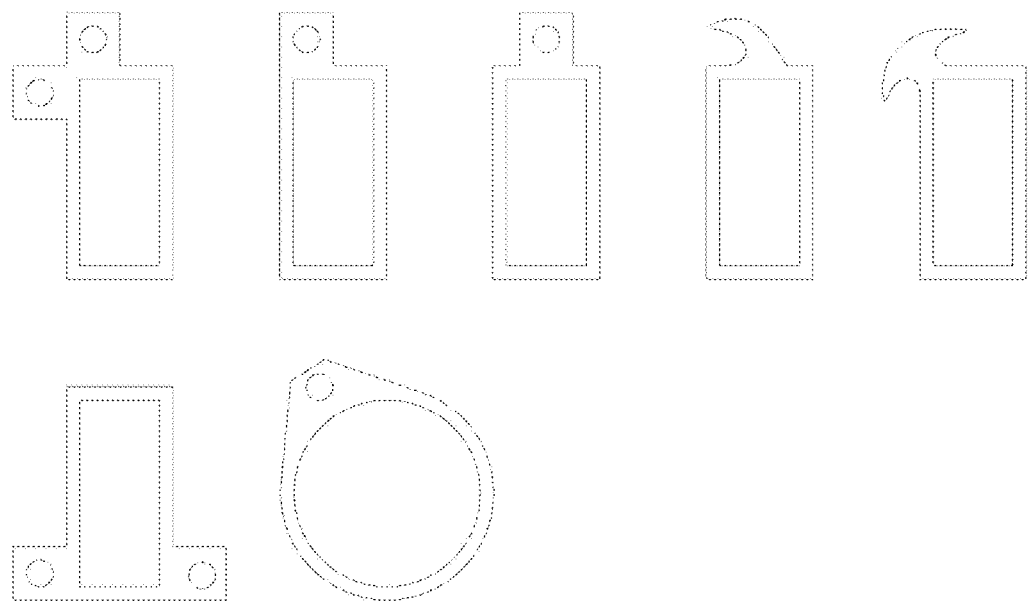
FIG. 16 depicts several cross sections of load bearing rails as optional embodiments of the present invention.

Referring now to an alternative embodiment of the present invention of FIG. 16, various cross sections of load bearing rails 10 are displayed. FIG. 16 serves to show optional ways in which protruding bosses and recessed load bearing features can be used in the manufacturing of load bearing rail 10. The designs contained herein do not limit the placement of, or functionality of protruding bosses and recessed load bearing features contained on load bearing rails 10.

In further detail of FIG. 16, load bearing rails 10 with cross sections containing protruding bosses and/or recessed load bearing features can be manufactured by means of extrusion, pultrusion, casting, or any other such method in which a load bearing rail can be produced. Material selection for a load bearing rail containing protruding bosses and/or recessed load bearing features can include, but are not limited to, metals, composites, plastics, or natural materials in which a structurally strong load bearing rail of the necessary design can be produced.

Figure 17:
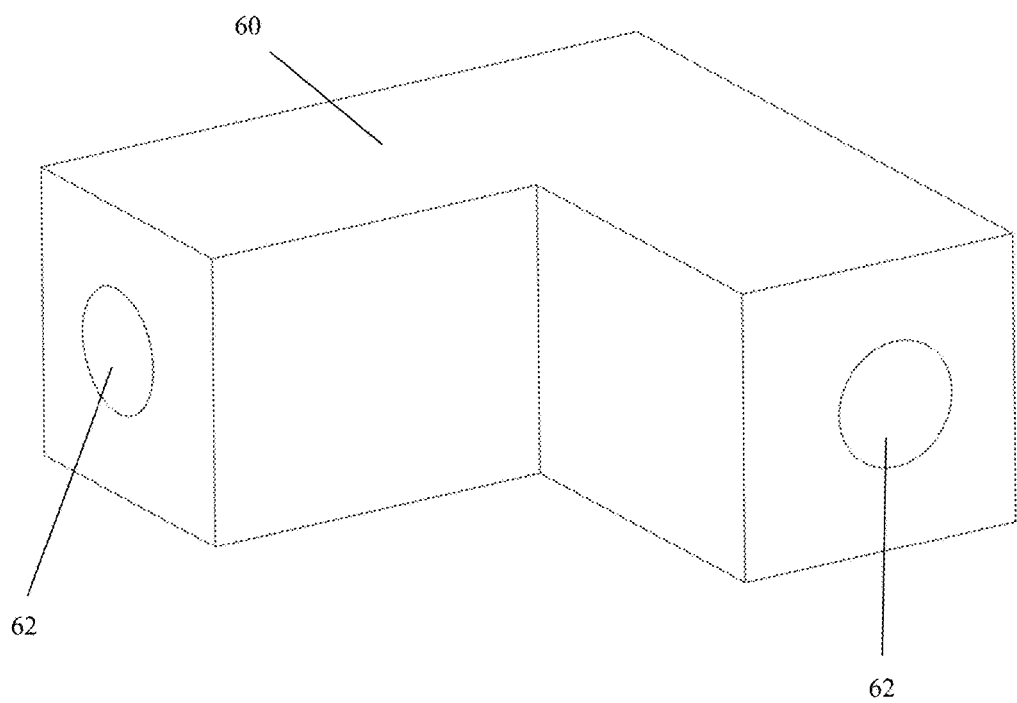
FIG. 17 displays an isometric view of a corner nut
Figure 18A:
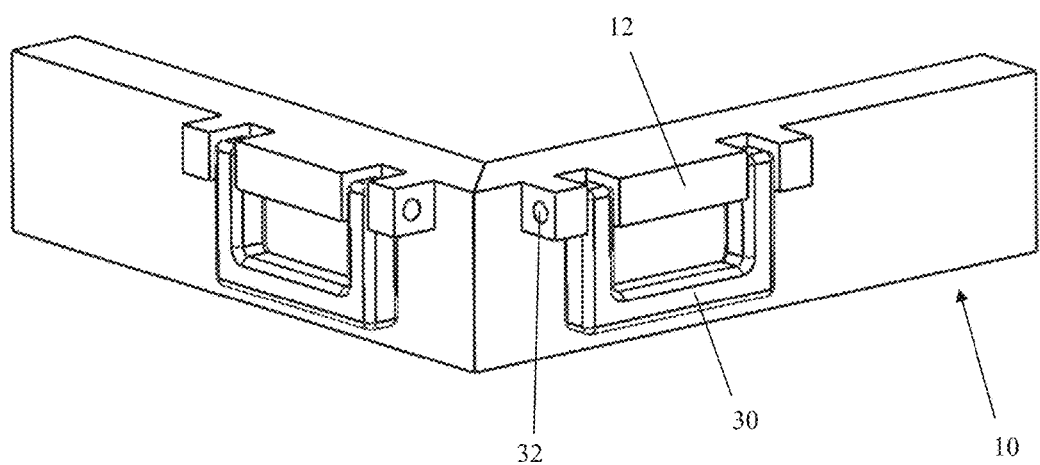
FIG. 18a shows an isometric view of a mitered corner of two load bearing rails
Figure 18B:
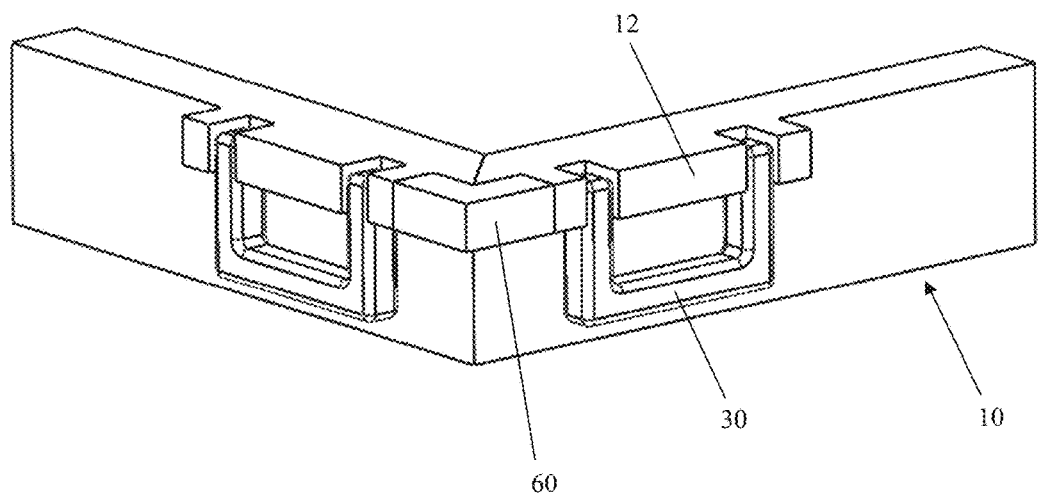
FIG. 18b shows an isometric view of a mitered corner of two load bearing rails with a corner nut assembled, joining the two rails.

Referring now to an alternative embodiment of the present invention of FIGS. 17, 18a, and 18b, corner nut 60 is displayed containing threads internally of corner nut holes 62. Corner nut 60 is a device which is fastened to protruding bosses 12 of a load bearing rail 10 via attachment hardware 32 and promotes effective means of transferring loads from one load bearing rail 10 to another.

In more detail, FIG. 17, FIG. 18a, and FIG. 18b, further illustrate the flexibility of integrating additional components to load bearing rail 10, such as corner nut 60, beyond a tie-down ring assembly as described in previous embodiments. Corner nut 60 is fastened to both load bearing rails 10 via attachment hardware 32 and constrained by protruding bosses 12 of said rails. Corner nut 60 physically attaches both load bearing rails 10 to one another which enhances the structural performance of the system to which the load bearing rails 10 are attached. Preferably, corner nut 60 has an angle complementary to the angle created at the intersection of both load bearing rails 10 to one another.

In further detail, corner nut 60 can be fabricated from materials such as metals, composites, plastics, or natural materials. Corner nut 60 is shaped such that the attachment hardware 32 is adequately supported within corner nut 60 and protruding bosses 12 of load bearing rail 10. Additionally, corner nut 60 may be constructed by means of casting, forging, machining, or any other fabrication method in which a suitably strong corner nut 60 can be conceived.

EXAMPLES

The following non-limiting examples illustrate the functionality and method of the cargo load restraint system in the most common use scenarios.

Example 1

Load bearing rails are securely attached to the perimeter edges of a 463L pallet sandwich panel.
Cargo is placed onto top surface of the pallet
Cargo is secured to the pallet by means of straps, chains, and/or nets which are placed on top of the cargo and looped through the tie-down rings on the load bearing rails.
Straps, chains, and/or nets are then tightened atop the cargo to secure it to the top surface of the pallet by applying tension to the tie-down ring and load bearing rail interface.
The cargo load restraint system must be designed such that the tension applied while securing the cargo to the pallet does not damage the tie-down ring and load bearing rail. Additionally, the cargo load restraint system must be designed such that moments of high acceleration (i.e. a quick turn, high speed braking, or crash) are coped with appropriately and no ultimate failure occurs between the tie-down ring and load bearing rail interface.

Example 2

Load bearing rails are mounted to the sides of a truck bed
Cargo is loaded into truck bed
Straps, chains, nets, or other devices can be used to secure the cargo by attaching said restraint devices to rings mounted appropriate distances throughout the length of the load bearing rail.
Straps, chains, nets, or other devices are then tightened and pulled against the load bearing rail through the attached rings until cargo is securely fastened

Example 3

Load bearing rails surround the perimeter of a 463L pallet
Protruding bosses of the load bearing rail are designed to accommodate interchangeable devices used to secure components to the load bearing rail
Additional protruding bosses are machined into the load bearing rail in beyond those used by a tie-down ring assembly
Portable shelter walls possess recessed and/or protruding attachment points which engage the extra protruding bosses of the load bearing rail
Attachment hardware is used to secure the portable shelter walls to the load bearing rail and create an integral unit
A 463L pallet has now been converted into a portable shelter wherein 4 walls are constructed and physically attached to the load bearing rails of the 463L pallet.

Example 4

A load bearing rail with protruding bosses runs the length of truck bed
Protruding bosses of the load bearing rail are shaped such that objects can be placed through the hole of a protruding boss and then rotated such that the object can not back its way out of the protruding boss
Objects such as tool boxes and storage containers can be restrained in this configuration making them easy to remove and for one to carry, and then reattach when work is complete

Example 5

Load bearing rail with recessed bosses surround a cargo pallet
Cargo is placed on top of the pallet and restraint devices wrapped around said cargo
Restraint devices posses an over-center clamp at each end and are hooked into the recessed bosses of the load bearing rail
When all restraint devices are in place, the over-center clamps are engaged, securing said cargo to said cargo pallet

Example 6

Load bearing rails surround the perimeter of a 463L pallet
The mitered corners of each load bearing rail comprise protruding bosses in which corner nuts are used and secured with attachment hardware.
The use of corner nuts to join the two separate rails increases the load bearing capability of the 463L pallet rails by more efficiently transferring loads from one location to another
Additionally, the use of corner nuts prevents excess movement at the end of each load bearing rail and separation of the corners when forces are applied In one embodiment the present invention provides a cargo restraint system comprising a load bearing perimeter rail and a tie-down ring assembly.

In another embodiment the load bearing perimeter rail of the cargo restraint system is further comprised of a plurality of protruding bosses wherein the bosses receive the tie-down ring assembly.

In still another embodiment the tie-down ring assembly is further comprised of a tie-down ring and a pin wherein the tie down ring is inserted through a hole in each of the plurality of protruding bosses of the load bearing perimeter rail. In a preferred embodiment the pin rotates at least 225° within the hole in each of the plurality of protruding bosses. In a most preferred embodiment the pin rotates up to 360° within the hole in each of the plurality of protruding bosses.

In a further embodiment the present invention provides an easily removable tie-down ring from a load bearing perimeter rail in the case of damage or repair.

In another embodiment the present invention provides bosses wherein the bosses as integral members of the load bearing perimeter rail and produce a superior load path for transferring forces from the tie-down ring, into the pin, and ultimately into the perimeter rail via the protruding bosses.

In yet another embodiment the present invention provides a method for manufacturing a perimeter rail wherein the perimeter rail includes protruded bosses in a single piece adding strength to the restraint system while reducing cost and down time for repairs.

In a preferred embodiment the present invention provides a means of attaching a load bearing piece of hardware directly to a rail with integrated bracket system.

In a further preferred embodiment the present invention provides a load bearing rail wherein the protruding bosses act as a bracket for the tie-down ring and eliminate the need for a secondary bracket in securing the tie-down ring.

In still another embodiment the present invention provides a cargo restraint system having a tie-down ring assembly capable of being pulled in any direction at 7,500 pounds without yielding. In a preferred embodiment the cargo restraint system is capable of being pulled in any direction by up to 11,250 pounds without ultimate failure. In a most preferred embodiment the cargo restraint system is capable of being pulled in any direction by up to 19,000 pounds without ultimate failure.

In yet another embodiment the present invention provides a load bearing rail comprised of aluminum or any sufficiently rigid and strong material such as composites, metals, or plastics manufactured by extrusion, pultrusion, casting or any other method of for making a sufficiently strong load bearing perimeter rail. In a preferred embodiment the boss is constructed from the same material as the load bearing perimeter rail.

An alternative embodiment of the present invention includes mounting components other than a tie-down ring assembly to the protruding bosses of the load bearing rail with attachment hardware.

Yet another alternative embodiment of the present invention includes mounting components other than a tie-down ring assembly to the protruding bosses of the load bearing rail by means other than attachment hardware and include but are not limited to locking mechanisms, press fit applications, rotating assemblies, and clamps.

In a further alternative embodiment, components capable of mounting to the load bearing rail include, but are not limited to, walls of portable shelters, seat rails, seats, shelters, bathrooms, kitchens, mounting fixtures, composite structures, metallic structures, plastic structures, and wooden structures.

In yet another alternative embodiment of the present invention, a load bearing rail used on a cargo pallet can be fabricated to possess additional protruding bosses such that the cargo pallet contains the required number of tie-down features as well as additional protruding bosses used to mount objects directly to the load bearing rail of the cargo pallet.

In yet another alternative embodiment of the present invention, a load bearing rail used on a 463L pallet can be fabricated to possess additional protruding bosses such that the 463L pallet contains the required 22 tie-down rings as well as additional protruding bosses used to mount objects directly to the load bearing rail of the 463L pallet.

In yet another alternative embodiment, a corner nut is used to attach two generally perpendicular load bearing rails in a way that transfers the load from one load bearing rail to a second rail by distributing stress from one component to another.

In a further alternative embodiment of the present invention, the load bearing rail possess protruding and/or recessed bosses used to attach objects such that the load path generated extends from the object being attached to the load bearing rail directly to said load bearing rail.

In yet another alternative embodiment of the present invention, recessed load bearing features located on the load bearing rail are used to attach components by means of, but not limiting to, interlocking mechanisms, press fit applications, and rotating assemblies, wedges, and clamps.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

What is claimed is:

1. A cargo restraint system comprising:
    (a) at least one load bearing rail wherein the at least one load bearing rail is further comprised of a recessed area positioned in a parallel manner relative to a top surface of the load bearing rail such that a lip is formed at the intersection of the top surface of the load bearing rail and the recessed area below;
    (b) at least one recessed load bearing feature positioned within the lip of the top surface of the load bearing rail; and
    (c) at least one restraint device to accommodate the fastening of cargo, wherein the cargo is fastened to the top surface of the load bearing rail through a locking interaction between the at least one restraint device and the at least one recessed load bearing feature,
    wherein the at least one load bearing rail of the cargo restraint system may be arranged in a geometric pattern that is complementary to the cargo to be fastened, wherein the geometric pattern created from the at least one load bearing rail is one selected from the group consisting of one approximating a triangle, one approximating a square and one approximating a polygon having five or more sides.

2. A cargo restraint system comprising:
    (a) at least one load bearing rail wherein the at least one load bearing rail is further comprised of a recessed area positioned in a parallel manner relative to a top surface of the load bearing rail such that a lip is formed at the intersection of the top surface of the load bearing rail and the recessed area below;
    (b) at least one recessed load bearing feature positioned within the lip of the top surface of the load bearing rail; and
    (c) at least one restraint device to accommodate the fastening of cargo, wherein the cargo is fastened to the top surface of the load bearing rail through a locking interaction between the at least one restraint device and the at least one recessed load bearing feature,
    wherein the at least one load bearing rail of the cargo restraint system may be arranged in a geometric pattern that is complementary to the cargo to be fastened, wherein the geometric pattern from the at least one load bearing rail comprises two different load bearing rails arranged in a parallel manner, whereby the parallel load bearing rails are separated by a distance of more than 12 inches.

3. A cargo restraint system comprising:
    (a) at least one load bearing rail, generally rigid in structure;
    (b) a series of protruding bosses, wherein the series of protruding bosses are arranged in a sequence comprising at least one protruding boss positioned adjacent to a recessed area, wherein the recessed area exists on either side of each protruding boss, wherein the series of protruding bosses are integrated laterally along the top surface of the at least one load bearing rail;
    (c) at least one intermodular feature comprising a generally flat form, with a series of protrusions extending perpendicular to a surface of the intermodular feature and arranged complementary to the series of protruding bosses in (b) such that the series of protrusions of the intermodular feature is capable of being locked in alignment with the protruding bosses in (b); and (d) an attachment feature capable of locking in alignment the protrusions of (c) with the protruding bosses of (b).

4. The cargo restraint system of claim 3, wherein the cargo is restrained against the at least one intermodular feature.

5. The cargo restraint system of claim 3, wherein at least one hole or indentation is present on a lateral surface of at least one side of the protruding boss in (b) and the protrusions in (c).

6. The cargo restraint system of claim 5, wherein the protruding bosses of (b) and the protrusions of (c) accommodate the attachment feature of (d) through alignment of the holes in order to lock the intermodular feature to the load bearing rail, with the attachment feature passing through the holes as aligned.

7. The cargo restraint system of claim 3, wherein each of the at least one intermodular feature comprises at least two protrusions extending perpendicular to the surface of the intermodular feature, wherein the at least two protrusions align on either side of one protruding boss integrated laterally along the top surface of the at least one load bearing rail.

8. The cargo restraint system of claim 3, wherein each of the at least one intermodular feature comprises four or more protrusions extending perpendicular to the surface of the intermodular feature, wherein the four or more protrusions align with two or more protruding bosses integrated laterally along the top surface of the at least one load bearing rail.

9. The cargo restraint system of claim 3, wherein the at least one load bearing rail is arranged to form an angle with a second load bearing rail.

10. The cargo restraint system of claim 9, wherein a corner nut is positioned at the angle where the two load bearing rails intersect, further wherein the corner nut comprises at least one hole or cavity that aligns with the hole or cavity on the protruding boss closest to the angle of the intersection of the two load bearing rails.

11. The cargo restraint of claim 3, wherein the at least one intermodular feature can rotate from about 0 degrees to about 300 degrees around the load bearing rail.

\* \* \* \* \*